United States Patent [19]
Hempel et al.

[11] Patent Number: 4,561,873
[45] Date of Patent: Dec. 31, 1985

[54] MODIFICATION OF DEPOSIT FORMATION IN GLASS FURNACE HEAT RECOVERY

[75] Inventors: Hans-Ulrich Hempel, Overath-Vilkerath; Rudolf Novotny, Duesseldorf; Siegfried Staller, Ratingen; Johannes Krämer, Duesseldorf, all of Fed. Rep. of Germany

[73] Assignee: Henkel Kommanditgesellschaft auf Aktien, Duesseldorf, Fed. Rep. of Germany

[21] Appl. No.: 677,253

[22] Filed: Dec. 3, 1984

Related U.S. Application Data

[63] Continuation of Ser. No. 676,958, Nov. 30, 1984, abandoned.

[30] Foreign Application Priority Data

Dec. 2, 1983 [DE] Fed. Rep. of Germany ....... 3343639

[51] Int. Cl.[4] .................................................. C03B 5/16
[52] U.S. Cl. ...................................... 65/27; 134/22.12; 134/22.13; 55/82; 165/5
[58] Field of Search .............. 65/27; 134/22.12, 22.13; 165/5; 55/82

[56] References Cited

U.S. PATENT DOCUMENTS

| | | | |
|---|---|---|---|
| 2,289,351 | 7/1942 | Dixon et al. | 134/22.12 X |
| 2,900,285 | 8/1959 | Darman et al. | 165/5 X |
| 3,003,899 | 10/1961 | Eberhard et al. | 134/22.12 |
| 3,888,302 | 6/1975 | Rounds | 165/5 X |
| 4,285,717 | 8/1981 | Novak | 65/27 X |
| 4,358,304 | 11/1982 | Froberg | 65/27 |
| 4,366,003 | 12/1982 | Korte et al. | 134/22.12 X |
| 4,444,128 | 4/1984 | Monro | 165/5 X |
| 4,509,989 | 4/1985 | Sumansky | 134/22.12 |

Primary Examiner—Arthur Kellogg
Attorney, Agent, or Firm—Ernest G. Szoke; Henry E. Millson, Jr.; Mark A. Greenfield

[57] ABSTRACT

Methods for removing deposits formed in the heat exchange tube of waste heat recovery boilers for glass furnaces in which sodium aluminum silicate fine particles are introduced into the waste gases before they enter the heat exchange tubes.

20 Claims, 1 Drawing Figure

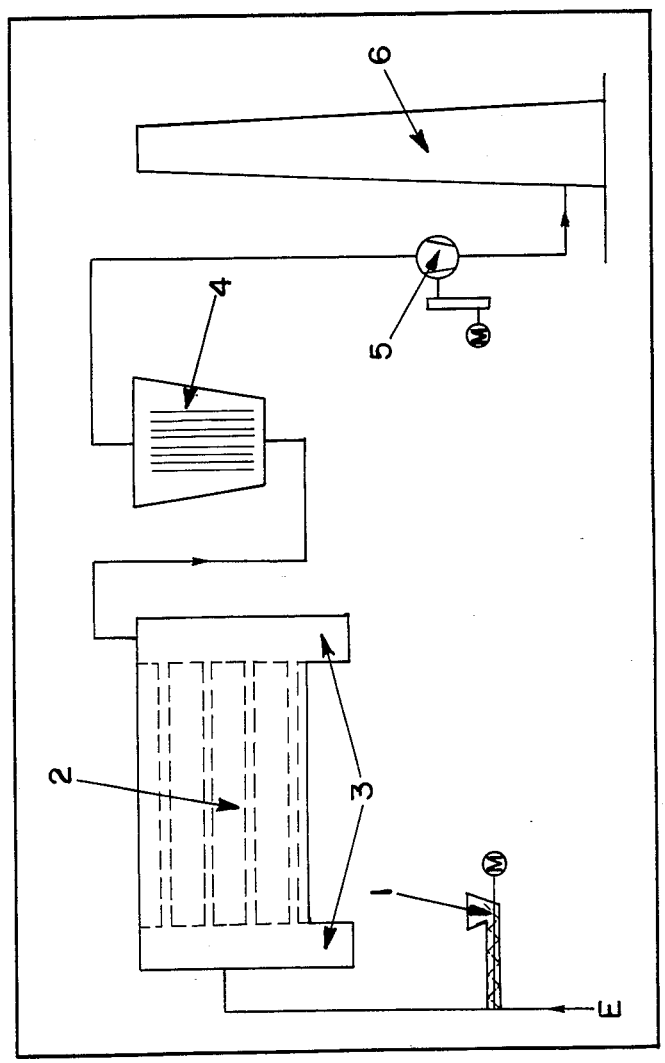

MODIFICATION OF DEPOSIT FORMATION IN GLASS FURNACE HEAT RECOVERY

This application is a continuation of Ser. No. 676,958 filed Nov. 30, 1984 now abandoned.

BACKGROUND OF THE INVENTION

1. Field of the Invention

This invention to a method of modifying the formation of difficultly removable deposits in waste heat recovery plants of glass furnaces, particularly soluble silicate furnaces, which facilitates removal of such deposits.

2. Statement of the Related Art

Glass and soluble silicates (waterglass) are generally produced in tank furnaces with regenerative firing (i.e., open-hearth furnaces). In this process, the waste gases which emanate from the combustion of fossil fuels in the tank furnaces and which normally contain sulfur compounds, for example, $SO_2$ or $SO_3$, leave the heat exchange chambers of the furnaces at temperatures of 450° to 700° C.

The heat content of these waste gases is often used for steam generation in a subsequent waste heat recovery plant employing steam boilers with tubular heat exchangers. In the course of the heat exchange process, these waste gases (which contain relatively large quantities of solids in supposedly evaporated form, such as alkali metal sulfates and alkali metal disulfates), are cooled to temperatures of 200° to 250° C. A large proportion of the evaporated solids desublimates during the cooling process and is deposited on the heat exchanger tubes in the form of a firmly adhering, heavily encrusted, and solid coating.

This coating, which becomes increasingly thicker, impairs heat transfer after only a short time so that the waste heat recovery plant operates increasingly less efficiently.

To ensure effective heat transfer in the heat exchanger tubes of the steam boilers, the insides of the tubes have to be cleaned at least once a day. The coatings which, in the case of soluble silicate furnaces, consist primarily of alkali metal sulfates and alkali metal disulfates and which are formed through desublimation of the evaporated solids present in the waste gases, are very solid, adhere firmly to the tube surfaces and, mechanically, can only be removed with considerable difficulty, often involving damage to the tube walls. For this reason, some heat recovery plants of the type in question are cleaned by spraying them internally with hot water. However, because of the highly acidic alkali metal disulfates, serious corrosion problems arise after the cleaning work has been conducted.

BRIEF DESCRIPTION OF THE INVENTION

The various above mentioned problems have hitherto remained unsolved.

It has now surprisingly been found that the described disadvantages, namely the formation of solid, (i.e., heavily encrusted and firmly adhering), salt layers through desublimation and the difficulties involved in their removal can be avoided by the addition of finely crystalline sodium aluminium silicates to the waste gas before it enters the steam boiler.

Accordingly, the present invention relates to a method of preventing the formation of difficultly removal deposits in waste heat recovery plants of glass furnaces by modifying the nature of those deposits. More specifically, this invention comprises:

(a) introducing natural and/or synthetic sodium aluminium silicates having an average particle size of from 0.5 to 50 μm via a metering means into glass furnace waste gases which are at a temperature of 450° to 700° C. before they enter the heat recovery steam boiler, in quantities of from 0.5 to 3 kg of silicate particles per 20,000 $Nm^3$ of waste gas per hour; and (b) removing the accumulated powder deposits from the heat exchanger tubes.

Other than in operating examples, or where otherwise indicated, all numbers expressing quantities of ingredients of defining ingredients or reaction conditions used herein are to be understood as modified in all instances by the term "about".

Any natural or synthetic sodium aluminium silicates having an average particle size of from 0.5 to 50 μm are suitable for the purposes of the invention, although it is preferred to use synthetic zeolites, particularly synthetic zeolites of the NaA type which have a mean chemical composition corresponding to the following summation formula $$1\pm0.2Na_2O.1Al_2O_3.2\pm0.5SiO_2.0 \text{ to } 6H_2O.$$

The X-ray diffractogram of zeolite NaA is known and is described in German published patent applications Nos. 10 38 015 and 10 38 017.

Zeolites having an average particle size of from 1 to 10 um and more especially from 3 to 4 μm are particularly suitable for carrying out the method according to the invention.

By way of non-limiting theoretical explanation, the effect of adding the sodium aluminium silicates is presumably that their particles act as condensation nuclei for the desublimation of the waste gas fractions which are still volatile at 450° C. to 700° C., but which accumulate in solid form on cooling and, in this way, prevent the salts from sintering together during desublimation. Thus, after the addition of zeolites to the hot waste gas, alkali metal sulfates and alkali metal disulfates, which normally accumulate in the form of very solid, compact layers in state of the art methods, instead form loose powders which are deposited by gravity, but which may readily be removed from the heat exchanger tubes.

The powder deposits accumulating are preferably blown out of the heat exchanger tubes by a single blast of compressed air at fixed intervals, expecially periodically at intervals of several days. The particular air pressure is not critical, although it must be adequate to remove the deposits, preferably substantially, most preferably almost totally.

Mechanical methods, for example steel brushes, may also be used for removing these deposits. In the case of vertically arranged heat exchanger tubes, the deposits may also be removed by knocking, ultrasound (for example, 40 c/s) or by shotblasting. Any physical means for powder removal may be employed, and this invention is not otherwise limited in this regard, although the above means (particularly compressed air) are preferred.

In a test of the comparable efficacy of the inventive method and the prior art, without additives and without cleaning of the heat exchanger tubes the amount of steam generated fell after 48 hours from 2.62 t/h to 1.96 t/h, i.e., by about 25%, as a result of impaired heat transfer. An approximately equal reduction before cleaning of the heat exchanger tubes was only observed after 120 h where the method according to the invention was used. After the heat exchanger tubes had been cleaned out by a single blast of compressed air, the values characteristic of the cleaned plant were again reached. In this connection, it is particularly important to bear in mind that using the inventive method, removal of the accumulated power deposits can be accomplished without having to shut down the heat exchanger plant. Accordingly, the method according to the invention provides for better utilization of the plant.

Another advantage of the method according to the invention lies in the fact that the addition of sodium aluminium silicates to the waste gases reduces the proportion of acidic disulfates in the dust deposited in favor of the formation of neutral sulfates. Accordingly, plant corrosion, which is a serious problem in prior art methods, is largely prevented. This is because it has been found that, with increasing additions of zeolites, the proportion of alkali metal sulfates in the dust increases and the pH of aqueous suspensions of the corresponding dusts from the waste heat boiler is also shifted into the more mildly acidic range.

In order to achieve the desired formation of readily removable powder deposits, it has proven to be preferable to add sodium aluminium silicate in a quantity of from 0.8 to 1.2 kg per 20,000 Nm$^3$ of waste gas per hour.

BRIEF DESCRIPTION OF THE DRAWING

The FIGURE shows a flow sheet of the method according to the invention.

DETAILED DESCRIPTION OF THE INVENTION

The waste gases from the tank furnaces enter the waste heat recovery plant at E with a temperature of 450° to 700° C. and in a quantity of approximately 18,000 to 20,000 Nm$^3$/h. A metering screw 1 dispenses sodium aluminium silicate into the waste gas stream in a quantity of from 0.5 to 3 kg/h. The gases flow through the heat exchanger tubes in the waste heat boiler 2. The zeolite dusts containing alkali metal sulfate and alkali metal disulfate are blown into the dust collecting ducts 3 by a single blast of compressed air which is repeated periodically at intervals of several days. After passing through the heat exchanger tubes, the waste gases may pass through an electrostatic filter 4 and a ventilator 5 substantially dust free into the waste gas chimney 6.

The invention is illustrated by the following Examples.

EXAMPLE 1

Sodium aluminium silicate was introduced by a metering screw in a quantity of 1.0 kg/h into the waste gas entering the waste heat boiler at a rate of 18,360 Nm$^3$/h with an average temperature of 550° C. On five consecutive days, the mean temperature of the waste gas behind the waste heat boiler was measured as was the average quantity of steam generated. The values are shown in Table 1 below.

TABLE 1

| elapsed time | Mean temperature behind the waste heat boiler (°C.) | Average amount of steam generated (t/h) |
|---|---|---|
| 1st day | 250 | 3.05 |
| 2nd day | 255 | 2.99 |
| 3rd day | 260 | 2.85 |
| 4th day | 270 | 2.67 |
| 5th day | 285 | 2.41 |

After the fifth day, the heat exchanger tubes were cleaned out with a blast of compressed air. After cleaning, the values of the first day were again reached.

A 10% aqueous suspension of the dust blown out showed a pH of 2.8.

The dust was found by analysis to contain:

$Na_2SO_4$: 13.9% by weight
$Na_2S_2O_7$: 51.2% by weight
(remainder: sodium aluminium silicate, $SiO_2$, $Al_2O_3$, $Fe_2O_3$).

EXAMPLE 2

The quantity of waste gas and its temperature on entering the boiler were the same as in Example 1. Sodium aluminium silicate was added to the inflowing waste gases in a quantity of 1.2 kg/h. The boiler exit temperatures reached and the average quantities of steam generated over a period of 5 days are shown in Table 2 below.

TABLE 2

| elapsed time | Mean temperature behind the waste heat boiler (°C.) | Average amount of steam generated (t/h) |
|---|---|---|
| 1st day | 240 | 3.11 |
| 2nd day | 255 | 2.95 |
| 3rd day | 260 | 2.87 |
| 4th day | 275 | 2.62 |
| 5th day | 290 | 2.31 |

After the fifth day, the tubes were cleaned out with a blast of compressed air. After cleaning, the values of the first day were again reached.

A 10% aqueous suspension of the dust blown out showed a pH of 4.9.

The dust was found by analysis to contain:

$Na_2SO_4$: 49.8% by weight
$Na_2S_2O_7$: 5.5% by weight
(remainder: sodium aluminium silicate, $SiO_2$, $Al_2O_3$, $Fe_2O_3$).

COMPARISON EXAMPLE

The quantity of waste gas and its temperature on entering the boiler were the same as in Example 1. No sodium aluminium silicate was added.

The boiler exit temperature of the waste gas and the average quantity of steam generated are shown in Table 3 below:

TABLE 3

| elapsed time | Mean temperature behind the waste heat boiler (°C.) | Average amount of steam generated (t/h) |
|---|---|---|
| 1st day | 265 | 2.62 |
| 2nd day | 280 | 1.96 |

After two days, the tubes had to be cleaned with a steel brush because the solid crusts formed could not be blown out.

The pH of a 10% suspension of the solids removed measured 1.2. The following composition was determined by analysis:

$Na_2SO_4$: 3.2% by weight
$Na_2S_2O_7$: 81.8% by weight

EXAMPLE 3

In a series of tests, different quantities of synthetic sodium aluminium silicates (zeolite NaA HAB A 40, a product of DEGUSSA AG) were added to the same quantities of gas entering the waste heat boiler. The pH of 10% aqueous suspensions of the corresponding dusts was measured and the content of sodium sulfate and sodium disulfate determined by analysis. The values are shown in Table 4 below:

TABLE 4

| Na—Al silicate (kg/hour) | pH | $Na_2SO_4$ (% by weight) | $Na_2S_2O_7$ (% by weight) |
|---|---|---|---|
| 0 | 1.2 | 3.2 | 81.8 |
| 1.0 | 2.8 | 13.9 | 51.2 |
| 1.2 | 4.9 | 49.8 | 5.5 |

Conclusions

With increasing additions of sodium aluminium silicate, the pH of the dusts shifts increasingly into the less acidic range. In addition, the percentage of neutral sodium sulfate is increased at the expense of the highly acidic sodium disulfate, which reduces the danger of plant corrosion.

We claim:

1. A method of facilitating the removal of desublimated evaporated solids deposited in heat exchange tubes of a boiler for waste heat recovery from glass furnace waste gases comprising:
    introducing natural and/or synthetic sodium aluminum silicates having an average particle size of about 0.5 to 50 μm via a metering means into said waste gases while they are at a temperature of about 450° to 700° C. and before said waste gases enter said boiler, in an amount adequate to prevent the formation of firmly adhering solid encrustations in said heat exchange tubes.

2. The method of claim 1 wherein said silicates are introduced in an amount of about 0.5 to 3 kg per 20,000 $Nm^3$ of waste gas per hour.

3. The method of claim 1 wherein said silicates are introduced in an amount of about 0.8 to 1.2 kg per 20,000 $Nm^3$ of waste gas per hour.

4. The method of claim 1 wherein said silicates have an average particle size of about 1 to 10 μm.

5. The method of claim 1 wherein said silicates have an average particle size of about 3 to 4 μm.

6. The method of claim 1 wherein said silicates are a synthetic zeolite.

7. The method of claim 6 wherein said zeolite is of the NaA type.

8. The method of claim 7 wherein said zeolite has a mean chemical composition corresponding to the summation formula:

$$1\pm0.2Na_2O.1Al_2O_3.2\pm0.5SiO_2.0 \text{ to } 6H_2O.$$

9. The method of claim 1 wherein said silicates are synthetic zeolites and are introduced in an amount of about 0.5 to 3 kg per 20,000 $Nm^3$ of waste gas per hour.

10. The method of claim 9 wherein said silicates are type NaA synthetic zeolites having an average particle size of about 1 to 10 μm.

11. The method of claim 8 wherein said silicates have an average particle size of about 3 to 4 μm and are introduced in an amount of about 0.8 to 1.2 kg per 20,000 $Nm^3$ of waste gas per hour.

12. The method of claim 1 wherein said glass furnace is producing soluble silicates.

13. A method of removing desublimated evaporated solids deposited in heat exchange tubes of a boiler for waste heat recovery from glass furnace waste gases, comprising:
    forming powdered, non-adhering, non-solid deposits of said desublimated solids in said heat exchange tubes by introducing natural and/or synthetic sodium aluminum silicates having an average particle size of about 0.5 to 50 μm via a metering means into said waste gases while they are at a temperature of about 450° to 700° C. and before said waste gases enter said boiler, in an amount of about 0.5 to 3 kg per 20,000 $Nm^3$ of waste gas per hour; and
    removing said formed powdered deposits by physical means.

14. The method of claim 13 wherein said silicates are type NaA synthetic zeolites having an average particle size of about 1 to 10 μm.

15. The method of claim 13 wherein said silicates are type NaA synthetic zeolites having an average particle size of about 3 to 4 μm, are introduced at a rate of about 0.8 to 1.2 kg per 20,000 $Nm^3$ of waste gas per hour, and said glass furnace is producing soluble silicates.

16. The method of claim 13 wherein said physical means is compressed air blown through said heat exchange tubes at a pressure adequate to remove said powdered, non-adhering, non-solid deposits.

17. The method of claim 16 wherein said compressed air is repeatedly blown at fixed intervals.

18. The method of claim 14 wherein said physical means is compressed air blown through said heat exchange tubes at a pressure adequate to remove said powdered, non-adhering, non-solid deposits.

19. The method of claim 15 wherein said physical means is compressed air blown through said heat exchange tubes at a pressure adequate to remove said powdered, non-adhering, non-solid deposits.

20. The method of claim 19 wherein said compressed air is repeatedly blown at fixed intervals.

* * * * *